L. W. SPENCER.

Making Cornet Tubes.

No. 63,760.

Patented April 9, 1867.

Bottom view of index plate

Witnesses:

Inventor:

United States Patent Office.

LEWIS W. SPENCER, OF NEW YORK, N. Y., ASSIGNOR TO SCHREIBER CORNET MANUFACTURING COMPANY, OF THE SAME PLACE.

Letters Patent No. 63,760, dated April 9, 1867.

IMPROVEMENT IN MACHINES FOR FORMING THE BRANCH TUBES OF VALVE CASES FOR CORNETS.

*The Schedule referred to in these Letters Patent and making part of the same.*

TO ALL WHOM IT MAY CONCERN:

Be it known that I, LEWIS W. SPENCER, of the city, county, and State of New York, have invented certain new and useful improvements in the Revolving Head Machines for Forming the Branch Tubes of Valve Cases for Cornets and Brass Musical Instruments; and I do hereby declare that the following is a full, clear, and exact description thereof, reference being had to the accompanying drawings, making part of this specification, in which—

Figure 1:
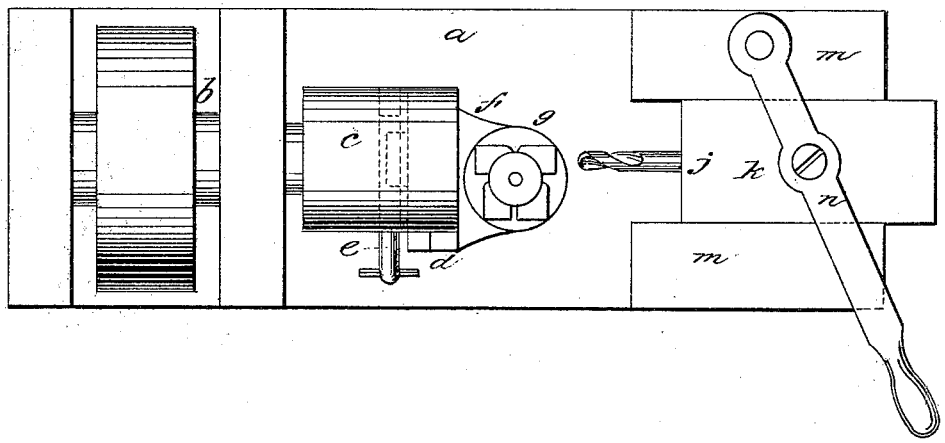

Figure 1 is a plan of the machine; and

Figure 2:
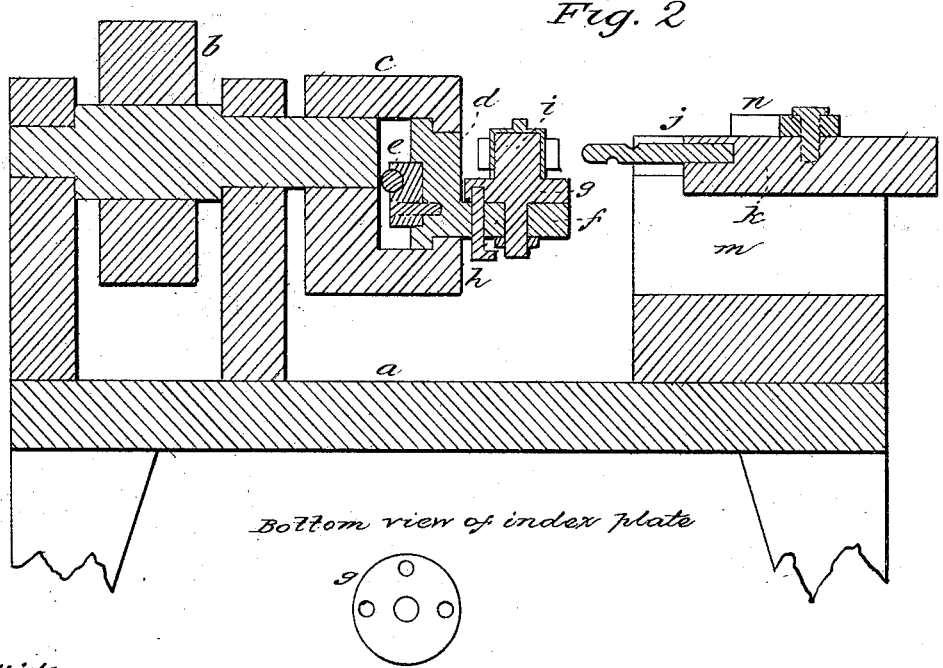

Figure 2 a longitudinal vertical section taken in the vertical plane of the axis of the mandrel.

The same letters indicate like parts of both the figures.

The valve cases in question consist of a hollow cylinder, in which a rotating valve is fitted, with four tangential branch pipes, two of them branching off in opposite directions and in the same line, and the other two side by side, and parallel, but at right angles with the two first mentioned. The case so to be formed is cast in one piece, and the object of my invention is to produce a machine by which the four branch pipes can be bored, and the outside partially finished by a series of operations, but without taking it from the machine.

In the accompanying drawings, $a$ represents a suitable bench, and $b$ a lathe mandrel to be mounted and driven in the usual way. The front end of the mandrel is provided with what may be termed a chuck, $c$, the front face of which is suitably recessed and formed with ways to receive a sliding head, $d$, which slides in the said ways at right angles to the axis of the mandrel. A screw, $e$, is mounted in the chuck and provided with a handle outside, by which it can be turned to act upon a nut or partial nut connected with the inner face of the sliding head $d$, to move it across the axis of the mandrel and set it to any desired position. A bracket, $f$, projects from the front face of the sliding head $d$, and to a hole in this bracket is fitted the spindle of what may be termed a circular index plate, $g$, and there secured so that it will be firm and steady, and yet admit of being turned. That face of the said index plate which is in contact with the bracket has three holes to receive in turn a pin, $h$, which passes through the bracket, and these three holes are at such distance apart as to correspond with the relative positions of the four branch pipes of the valve cases to be wrought, one hole answering for the two branch pipes which are parallel. The spindle of this index plate projects from the outer face as at $i$, of diameter and length to fit the bore of the valve case snugly, and hold it with its axis at right angles to the axis of the mandrel. The tools for boring the branch pipes and for turning the outside thereof are fitted, as at $j$, to one end of a stock, $k$, adapted to slide in ways in puppets $m$ $m$, and provided with a lever, $n$, by which the tool can be forced up to its work. The axis of the tool and the axis of the mandrel should be in line. A blank for a valve is placed on the spindle $i$ as represented, with one of the branches corresponding with one of the index holes in the index plate. In this condition the axis of one of the branch pipes will be parallel with the axis of the mandrel. The bracket $f$ is so far out of centre that the valve case when placed on the spindle will be so situated that a plane passing through the axis of all the branch pipes will coincide with the axis of the mandrel. The sliding head $d$ is then moved to bring the axis of the branch pipe to be operated upon in the vertical plane of the axis of the mandrel, and then the mandrel being rotated and the tool brought to work, the said branch pipe will be either bored or turned on the outside, depending upon the tool that is in the stock. And when this pipe is finished the index plate is turned and the next branch is operated upon, and so in succession with all of them. The four may be first bored in succession and then turned in succession, or *vice versa*, or each one may be bored and turned and then the others in succession, as this is a matter entirely at the discretion of the workman.

It will be obvious, from the foregoing, that by means of this machine the said valve cases can be made accurately, and at much less expense than by any other known means.

What I claim as my invention, and desire to secure by Letters Patent, is—

The combination of the mandrel, the slide on the chuck of the mandrel, the index plate with its spindle at right angles to the axis of the mandrel, and also to the slide, and the sliding stock or tool-holder, substantially as and for the purpose described.

L. W. SPENCER.

Witnesses:
    WM. H. BISHOP,
    ANDREW DE LACY.